(12) United States Patent
Kindkeppel et al.

(10) Patent No.: US 9,415,333 B2
(45) Date of Patent: *Aug. 16, 2016

(54) FILTRATION SEALING SYSTEM

(75) Inventors: Caryn J. Kindkeppel, Sun Prairie, WI (US); Brian W. Schwandt, Fort Atkinson, WI (US); Thomas J. Braun, Stoughton, WI (US); Christopher E. Holm, Madison, WI (US); Pathikrit T. Banerjee, Abu Dhabi (AE); Buwa A. Baldeh, Madson, WI (US)

(73) Assignee: Cummins Filtration IP, Inc., Columbus, IN (US)

(*) Notice: Subject to any disclaimer, the term of this patent is extended or adjusted under 35 U.S.C. 154(b) by 893 days.

This patent is subject to a terminal disclaimer.

(21) Appl. No.: 13/299,419

(22) Filed: Nov. 18, 2011

(65) Prior Publication Data

US 2012/0061307 A1    Mar. 15, 2012

Related U.S. Application Data

(63) Continuation of application No. 12/420,884, filed on Apr. 9, 2009, now Pat. No. 8,061,530.

(51) Int. Cl.
*B01D 35/30* (2006.01)
*B01D 29/01* (2006.01)
*B01D 46/00* (2006.01)
*B01D 46/10* (2006.01)

(52) U.S. Cl.
CPC .............. *B01D 35/30* (2013.01); *B01D 29/01* (2013.01); *B01D 46/009* (2013.01); *B01D 46/10* (2013.01); *B01D 2201/34* (2013.01); *B01D 2201/4046* (2013.01)

(58) Field of Classification Search
CPC ...................................................... B01D 29/01
USPC ................................................. 210/232–234
See application file for complete search history.

(56) References Cited

U.S. PATENT DOCUMENTS

| | | | |
|---|---|---|---|
| 2,910,332 A * | 10/1959 | Madsen et al. | ............... 277/446 |
| 4,181,313 A | 1/1980 | Hiller et al. | |
| 4,572,522 A | 2/1986 | Smagatz | |
| 4,617,122 A | 10/1986 | Kruse et al. | |
| 4,915,831 A | 4/1990 | Taylor | |
| 5,484,466 A | 1/1996 | Brown et al. | |
| 5,863,424 A | 1/1999 | Lee | |
| 6,402,798 B1 | 6/2002 | Kallsen et al. | |
| 6,478,018 B2 | 11/2002 | Fedorowicz et al. | |
| 6,478,019 B2 | 11/2002 | Fedorowicz et al. | |
| 6,902,598 B2 | 6/2005 | Gunderson et al. | |
| 7,070,641 B1 | 7/2006 | Gunderson et al. | |
| 7,217,361 B2 | 5/2007 | Connor et al. | |
| 7,247,183 B2 | 7/2007 | Connor et al. | |
| 7,582,130 B2 | 9/2009 | Ng et al. | |
| 7,776,139 B2 | 8/2010 | Schwandt et al. | |
| 7,828,869 B1 | 11/2010 | Parikh et al. | |
| 7,959,714 B2 | 6/2011 | Smith | |
| 2002/0046556 A1 | 4/2002 | Reid | |
| 2003/0184025 A1 | 10/2003 | Matsuki | |
| 2004/0040271 A1 | 3/2004 | Kopec et al. | |

(Continued)

*Primary Examiner* — Peter Keyworth
(74) *Attorney, Agent, or Firm* — Foley & Lardner LLP

(57) ABSTRACT

A filtration sealing system is provided for sealing a filter element in a housing at a mating interface therebetween. The sealing system includes a keyed interface. A replacement filter element is provided for such filtration sealing system, with the replacement filter element including a keyed interface.

6 Claims, 7 Drawing Sheets

(56) References Cited

U.S. PATENT DOCUMENTS

| | | |
|---|---|---|
| 2006/0213139 A1 | 9/2006 | Stramandinoli |
| 2007/0175815 A1 | 8/2007 | Thomas |
| 2007/0240392 A1 | 10/2007 | Ng et al. |
| 2008/0107765 A1 | 5/2008 | Considine et al. |
| 2009/0090669 A1 | 4/2009 | Holzmann |
| 2009/0126324 A1 | 5/2009 | Ng et al. |
| 2009/0193972 A1 | 8/2009 | Schwandt |
| 2010/0051528 A1 | 3/2010 | Derstler et al. |
| 2010/0065203 A1 | 3/2010 | Tanbour |
| 2010/0077710 A1 | 4/2010 | Severance et al. |
| 2010/0258493 A1 | 10/2010 | Kindkeppel et al. |

\* cited by examiner

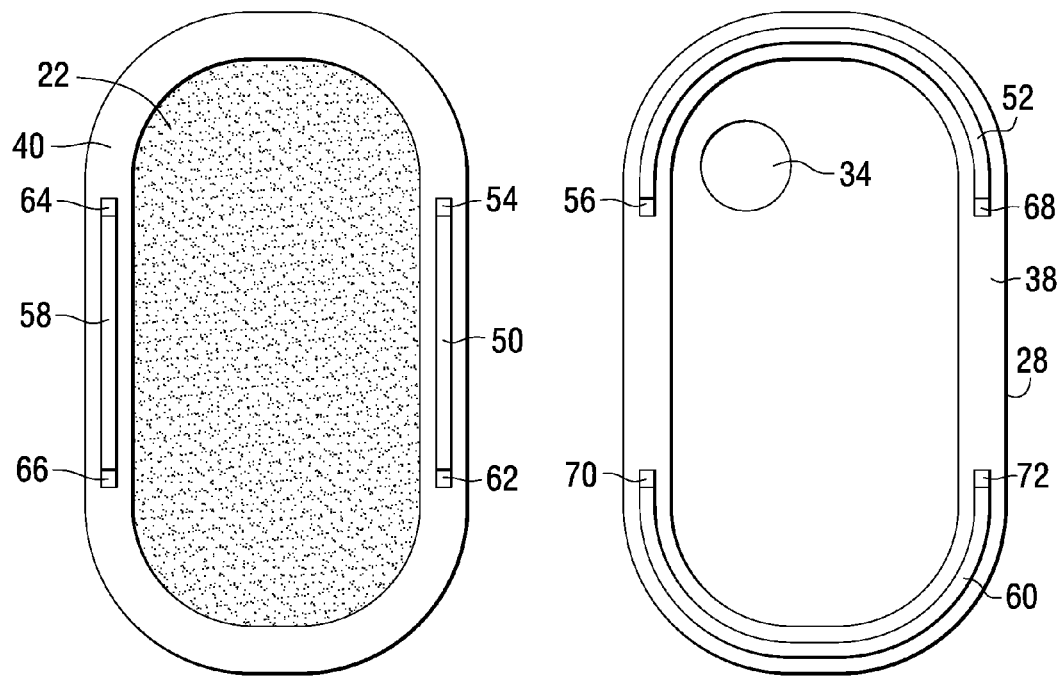
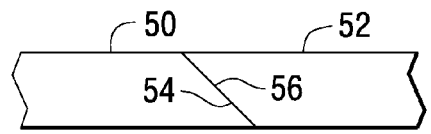
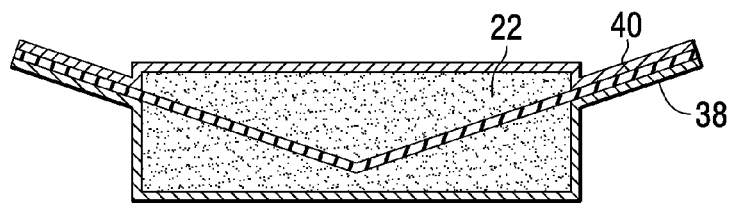
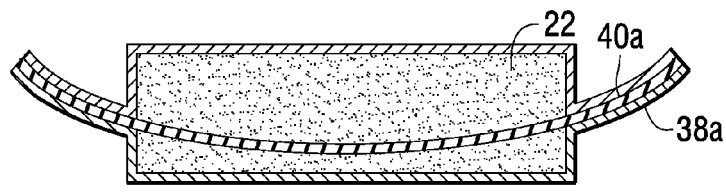

FILTRATION SEALING SYSTEM

CROSS REFERENCE TO RELATED APPLICATION

This application is a continuation of U.S. patent application Ser. No. 12/420,884, filed Apr. 9, 2009.

BACKGROUND AND SUMMARY

The invention relates to filtration sealing systems, including filter elements, housings, and replacement filter elements.

Filtration sealing systems are known for sealing a filter element in a housing at a mating interface therebetween. The present invention arose during continuing development efforts in filtration sealing technology, including in the preferred embodiment directed toward improvements in one or more of the following: a system permitting installation or replacement of only an authorized filter element; a system permitting installation or replacement of a filter element only in a given orientation; improved dimensional stability of a gasket and/or housing in sealing relation along a border; a system providing one-way-only fit of a filter element in the housing; replacement filter elements for the above systems; improved sealing along housing ports.

BRIEF DESCRIPTION OF THE DRAWINGS

FIG. 6 is an elevation view of an alternate embodiment of a component of FIG. 1 in accordance with the invention.

FIG. 7 is an elevation view of an alternate embodiment of a component of FIG. 1 in accordance with the invention.

FIG. 8 is a sectional view illustrating mating of the components of FIGS. 6 and 7.

FIG. 9 is like FIG. 8 and shows another embodiment.

FIG. 10 is like FIG. 9 and shows another embodiment.

DETAILED DESCRIPTION

Figure 1:
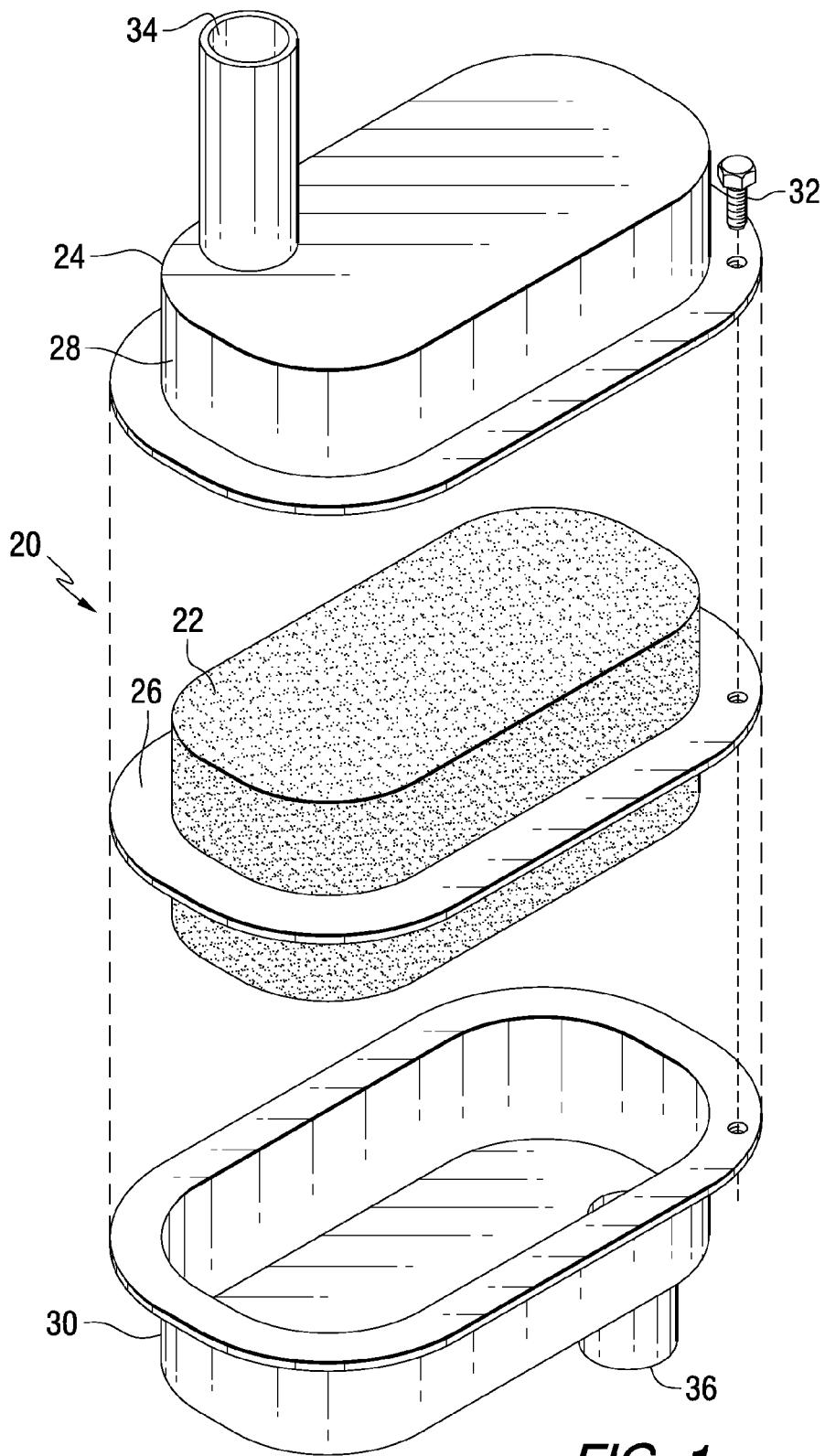
FIG. 1 is an exploded perspective view of a filter element in a housing.

FIG. 1 shows a filtration sealing system 20 for sealing a filter element 22 in a housing 24 at a mating interface such as 26 therebetween, to be described. The housing is provided by mating housing sections 28 and 30 mounted and attached to each other in any suitable manner, such as clamps, bolts (e.g. as shown in dashed line at 32), and so on. The housing has an inlet port 34 for receiving fluid to be filtered, e.g. gas (including air) or liquid, which fluid flows through filter element 22 and is discharged as clean filtered fluid at outlet port 36.

Figure 2:
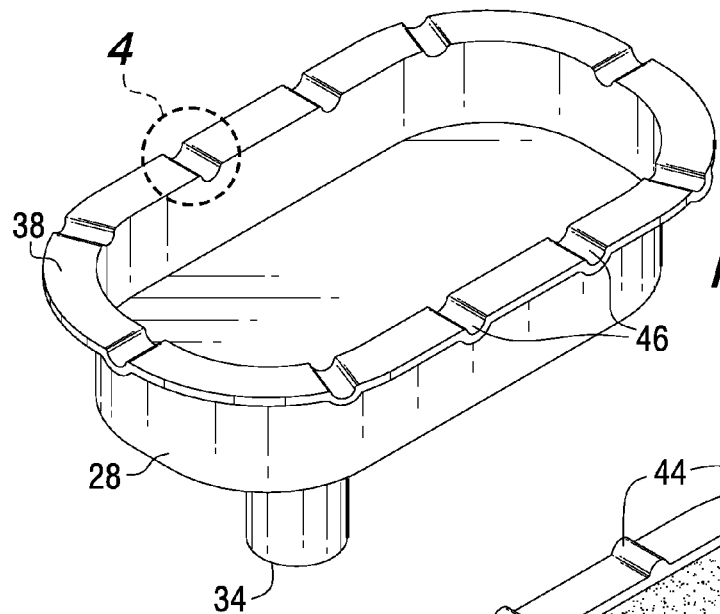
FIG. 2 is a perspective view of a component of FIG. 1 and illustrating the present invention.
Figure 3:
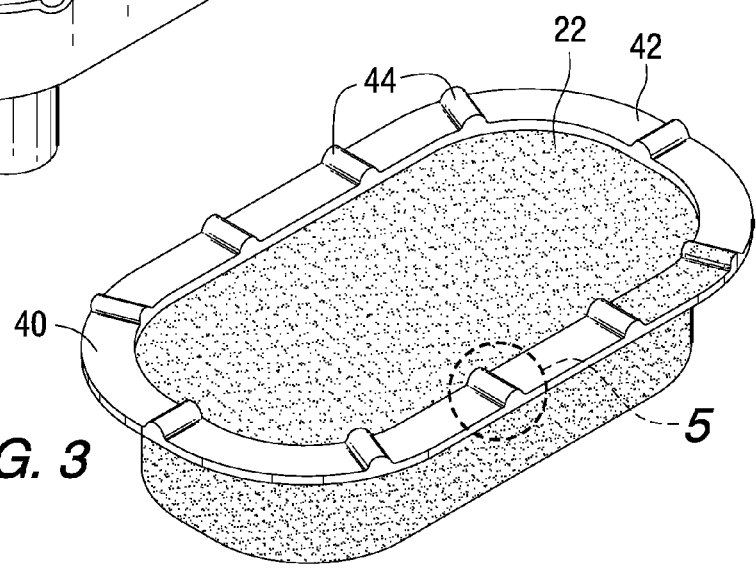
FIG. 3 is a perspective view of a component of FIG. 1 and illustrating the present invention.
Figure 4:
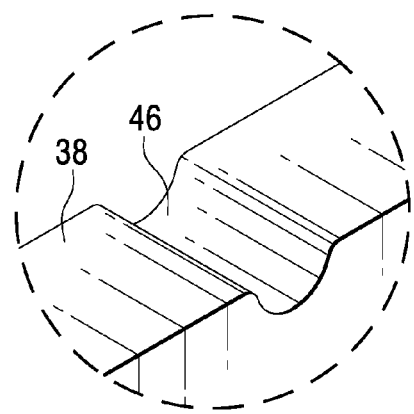
FIG. 4 is an enlarged view of a portion of FIG. 2.
Figure 5:
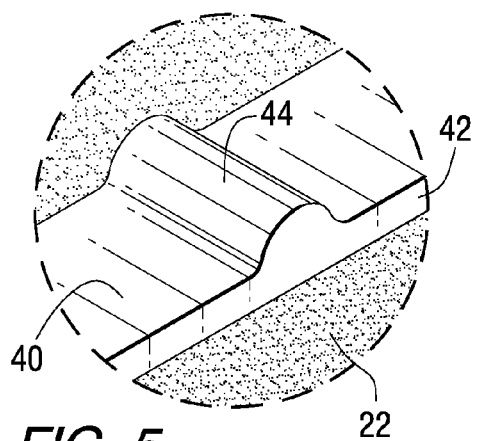
FIG. 5 is an enlarged view of a portion of FIG. 3.

The sealing system includes a keyed interface as shown at 38 in FIG. 2 and 40 in FIG. 3. FIG. 2 is a perspective view of upper housing section 28 turned over to view the underside thereof. FIG. 3 is a perspective view of filter element 22 having a border 42 which may be composed of gasket material itself or may have a gasket added thereto. Keyed interface 38, 40 permits installation or replacement of only an authorized filter element 22 mating to the mating interface. The keyed interface permits installation or replacement of the filter element only in a given orientation. Filter element 22 and housing section 28 have borders mating with each other at a gasket 42 therebetween and providing the noted mating interface. The gasket and at least one of the housing and the filter element engage each other in detent relation providing the noted keyed interface. In the embodiment of FIGS. 2, 3 gasket 42 extends along an extension direction along a perimeter. The gasket has one or more humped arches such as 44, FIGS. 3, 5, spaced along the perimeter and extending transversely of the noted extension direction. Housing section 28 has one or more concave recessed slits such as 46, FIGS. 2, 4, spaced along the border along the perimeter and extending transversely of the noted extension direction and complementally receiving respective humped arches 44 therein. The arches and slits may be regularly or irregularly spaced, and may be symmetric or non-symmetric around the perimeter. In one embodiment, gasket 42 is in-molded to and integral with filter element 22. The one or more concave recessed slits 46 are in the housing border. The plurality of humped arches 44 and the plurality of concave recessed slits 46 are in complemental detent relation engagement and are selectively spaced along the perimeter to provide dimensional stability of the housing at the gasket in sealing relation along the border. At least one of the sides, shape and spacing of at least the set of one or more humped arches 44 and the set of one or more concave recessed slits 46 is selectively configured to allow a one-way fit of the filter element in the housing to ensure correct installation every time.

FIGS. 6-8 show a further embodiment and use like reference numerals from above where appropriate to facilitate understanding. At least two gaskets are provided, including a first gasket 50 on the filter element, and a second gasket 52 on the housing. The gaskets engage each other in keyed relation and sealing engagement. The filter element and the housing have borders 40 and 38 mating with each other at two-part gasket 50, 52 therebetween and providing the mating interface. The two-part gasket is provided by at least first gasket 50 and second gasket 52. Gasket 50 has a gasket-engagement surface 54 for engaging gasket 52. Gasket 52 has a gasket-engagement surface 56 for engaging gasket 50. The gasket-engagement surfaces 54 and 56 engage each other in keyed relation providing the keyed interface. The two-part gasket extends along an extension direction along a perimeter. Gasket 50 extends along the extension direction to a beveled end 54 tapered along a first taper along the extension direction. Gasket 52 extends along the extension direction to a beveled end 56 tapered along a second taper along the extension direction. The first and second tapers are opposite and complemental to each other, FIG. 8. The beveled ends at 54 and 56 engage each other in sealed relation at the keyed interface.

In one embodiment, the first gasket includes first and second gasket segments 50 and 58 opposite each other across the perimeter. The second gasket includes third and fourth gasket segments 52 and 60 opposite each other across the perimeter. First gasket segment 50 is between fourth and third gasket segments 60 and 52 along the extension direction along the perimeter. Third gasket segment 52 is between first and second gasket segments 50 and 58 along the extension direction along the perimeter. Second gasket segment 58 is between third and fourth gasket segments 52 and 60 along the perimeter. Fourth gasket segment 60 is between second and first gasket segments 58 and 50 along the extension direction along the perimeter. First gasket segment 50 extends along the extension direction between distally opposite first and second beveled ends 62 and 54 tapered along opposing first and second tapers along the extension direction. Second gasket segment 58 extends along the extension direction between distally opposite third and fourth beveled ends 64 and 66 tapered along opposing third and fourth tapers along the extension direction. Third gasket segment 52 extends along the extension direction between distally opposite fifth and sixth beveled ends 56 and 68 tapered along opposing fifth and sixth tapers along the extension direction. Fourth gasket segment 60 extends along the extension direction between distally opposite seventh and eighth beveled ends 72 and 70 tapered along opposing seventh and eighth tapers along the extension direction. The first and eighth beveled ends engage each other in sealed relation. The second and fifth beveled ends engage each other in sealed relation. The third and sixth beveled ends engage each other in sealed relation. The fourth and seventh beveled ends engage each other in sealed relation.

In some embodiments, the two-part gasket includes only first and second gaskets, with the first gasket extending along the extension direction between distally opposite first and second beveled ends tapered along opposing first and second tapers along the extension direction, and with the second gasket extending along the extension direction between distally opposite third and fourth beveled ends tapered along opposing third and fourth tapers along the extension direction, and with the first and third beveled ends engaging each other in sealed relation, and with the second and fourth beveled ends engaging each other in sealed relation.

Figure 11:
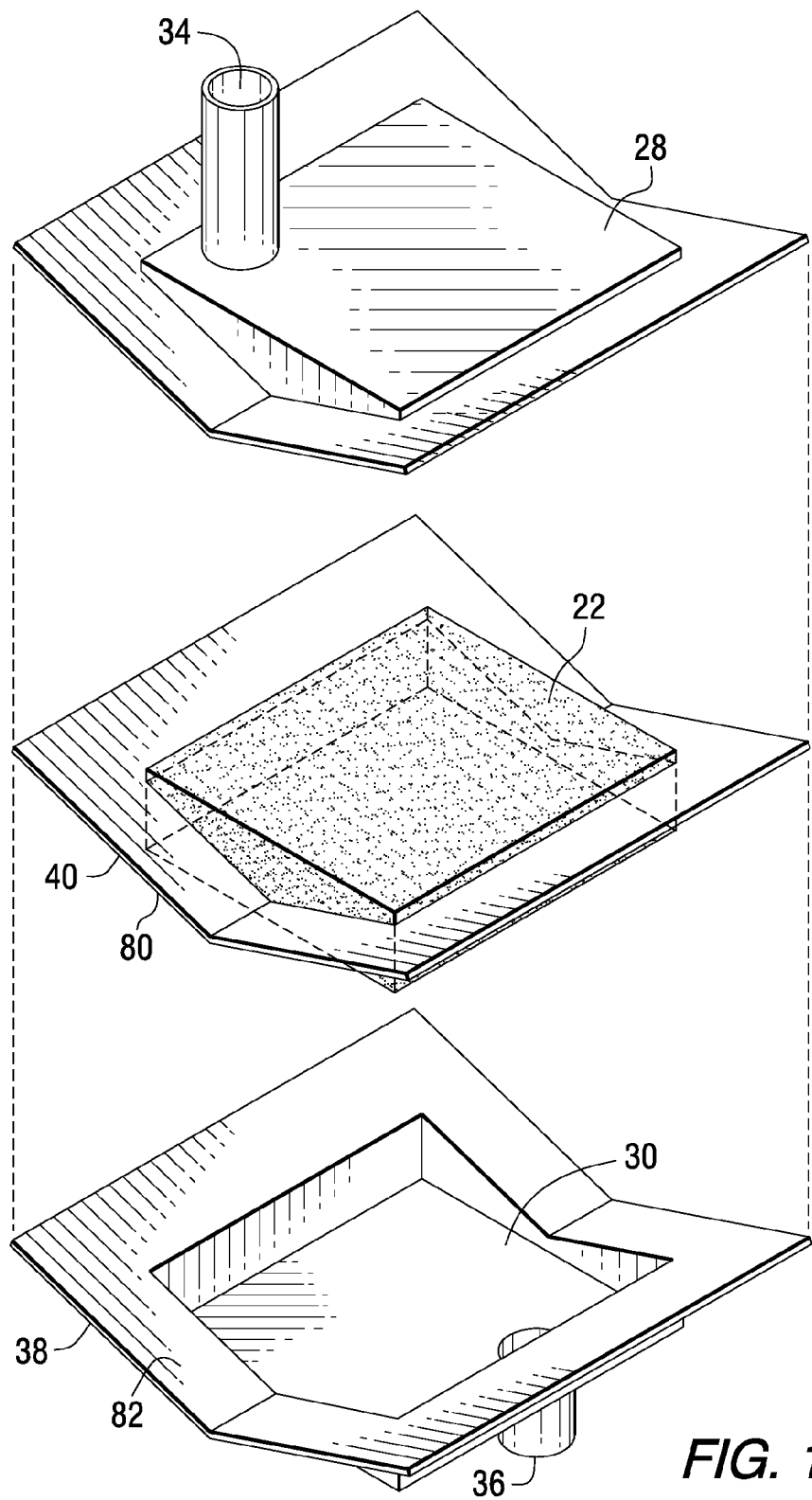
FIG. 11 is like FIG. 1 and further illustrates the embodiment of FIG. 9.
Figure 12:
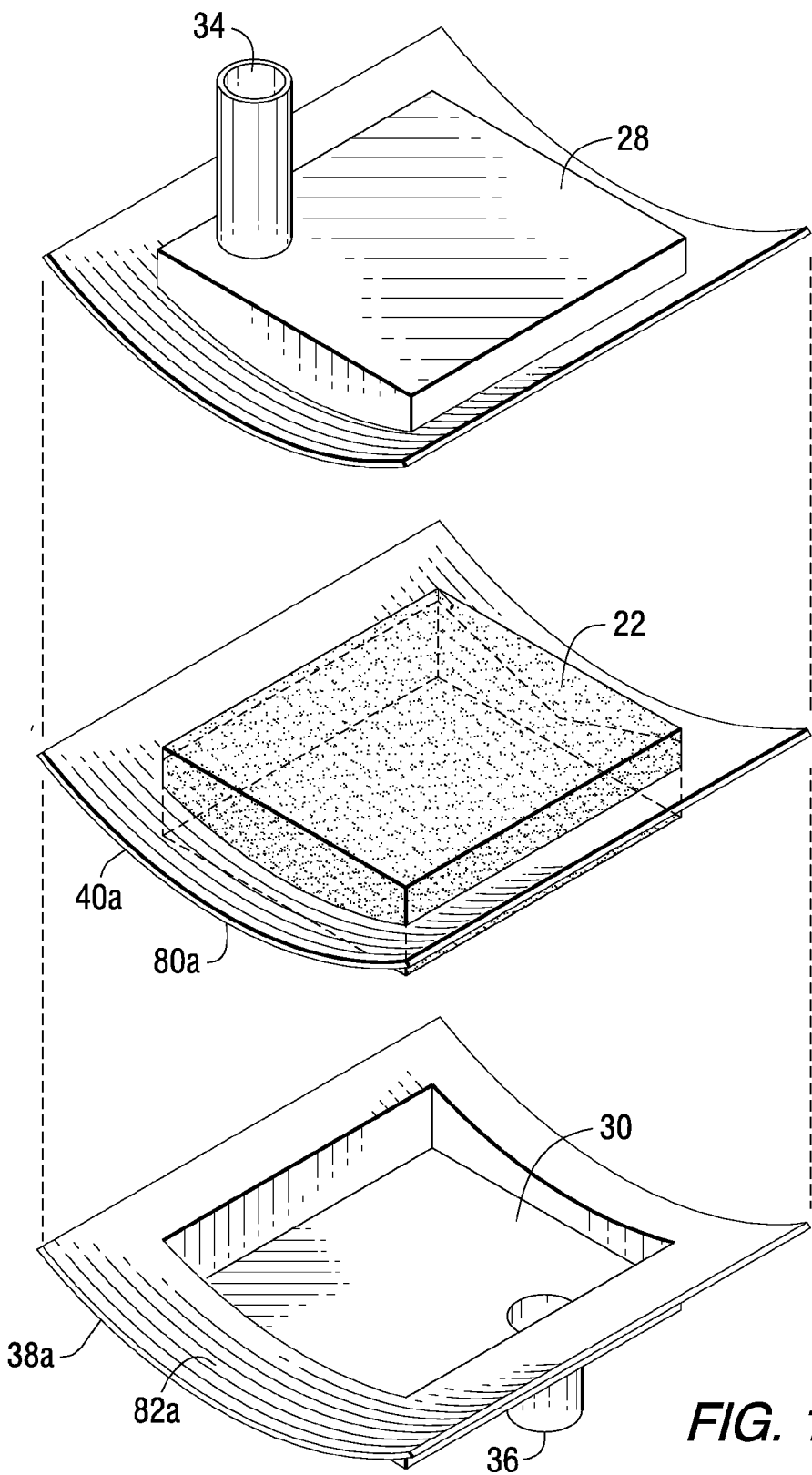
FIG. 12 is like FIG. 1 and further illustrates the embodiment of FIG. 10.

FIGS. 9-12 show further embodiments and use like reference numerals from above where appropriate to facilitate understanding. The filter element and the housing have respective borders 40 and 38 mating with each other at the noted mating interface and extending along an extension direction along a perimeter, FIG. 11. The mating interface has a width extending along a radial direction relative to the perimeter. The mating interface has a length extending along the noted extension direction. The borders have facing surfaces at the mating interface, including a first facing surface 80 on the filter element, and a second facing surface 82 on the housing. At least one of the first and second facing surfaces extends non-rectilinearly along the noted extension direction along the noted length to provide the keyed interface, FIG. 11. In the preferred embodiment, each of the first and second facing surfaces 80 and 82 extends non-rectilinearly along the noted extension direction along the noted length to provide the keyed interface, with one of the facing surfaces, e.g. 82, receiving the other of the facing surfaces, e.g. 80, in nested relation. In FIGS. 9 and 11, the keyed interface has a V-shape in a cross-sectional plane taken transversely to the noted radial direction. In such embodiment, each of the first and second facing surfaces 80 and 82 has the noted V-shape in the noted cross-sectional plane taken transversely to the noted radial direction, with the V-shape of one of the facing surfaces, e.g. 82, being a concave V-shape relative to the interface, and with the V-shape of the other of the facing surfaces, e.g. 80, being a convex V-shape relative to the interface, the one facing surface of concave V-shape receiving the other facing surface of convex V-shape in nested relation. In FIGS. 10 and 12, the keyed interface 40a, 38a, at facing surfaces 80a and 82a has an arcuate shape in a cross-sectional plane taken transversely to the noted radial direction. In the preferred embodiment, each of the first and second facing surfaces 80a and 82a has the arcuate shape in the noted cross-sectional plane taken transversely to the noted radial direction, with the arcuate shape of one of the facing surfaces, e.g. 82a, being a concave arcuate shape relative to the interface, and with the arcuate shape of the other of the facing surfaces, e.g. 80a, being a convex arcuate shape relative to the interface, and with the one facing surface of concave arcuate shape receiving the other facing surface of convex arcuate shape in nested relation.

Figure 13:
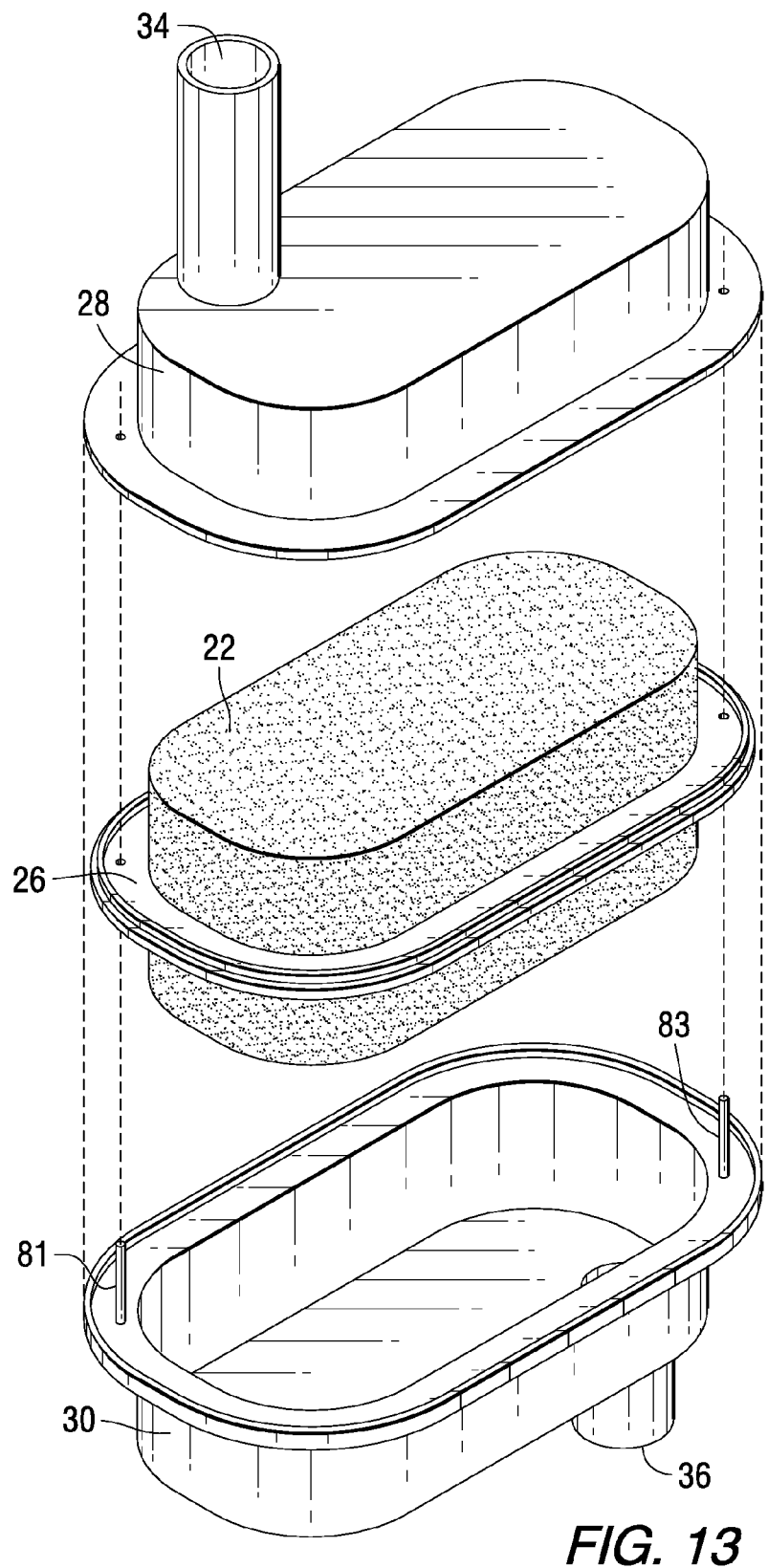
FIG. 13 is like FIG. 1 and shows another embodiment.

FIG. 13 shows another embodiment having one or more mounting pin locators such as 81, 83 along the borders, providing in one embodiment one or more given or specific orientations of the filter element and the housing. In another embodiment, the one or more mounting pin locators provide one-way-only fit of the filter element in the housing. In another embodiment, the one or more mounting pin locators provide replacement of only an authorized replacement filter element.

Figure 14:
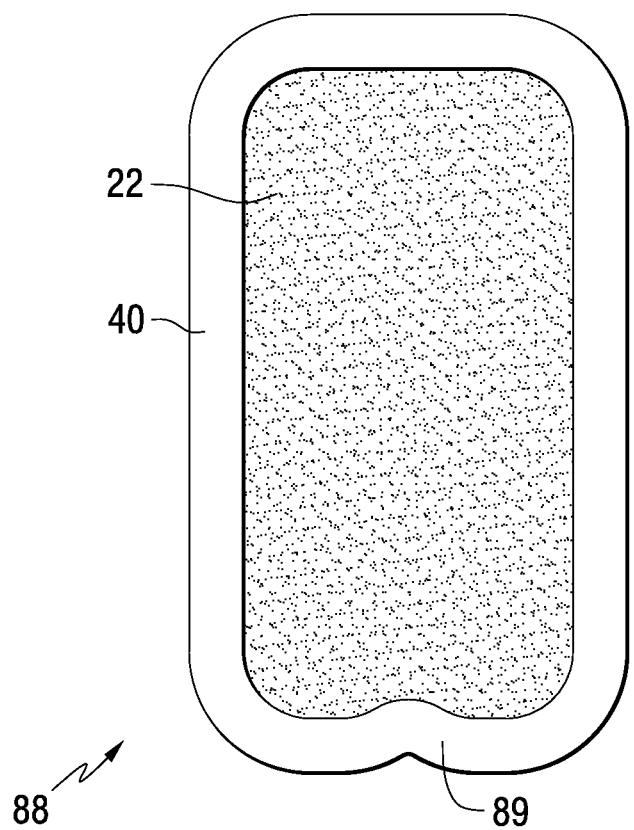
FIG. 14 is like FIG. 6 and shows another embodiment.

In further embodiments, the filter element and the housing have borders 40 and 38 mating with each other at a seal at the mating interface and extending along the extension direction along a perimeter defining an engagement plane, with each border and the seal having a non-symmetrical shape in the noted engagement plane, such as non-symmetrical shape 88 in FIG. 14, or other non-non-symmetrical shapes. In one embodiment, the seal is provided by a gasket 89, and the gasket follows a non-symmetrical profile. In a further embodiment, the non-symmetrical profile of gasket 89 reduces volume of the housing. In one embodiment, the border has a portion with a heart shape segment, for example as shown at 89. The borders on the filter element and the housing are complemental to each other in the engagement plane, which in combination with non-symmetry provides one-way-only fit of the filter element in the housing. In a further embodiment, the filter element and the housing have borders mating with each other at the mating interface and extending along the extension direction along a perimeter defining an engagement plane and are configured to provide one-way-only fit of the filter element in the housing.

Further in the preferred embodiment, a replacement filter element 22 is provided for the noted filtration sealing system wherein the replacement filter element includes the noted keyed interface. The filter element includes a keyed border providing the keyed interface.

Further in the preferred embodiment, a filtration sealing system is provided for a filter having a filter element in a housing having at least two sections, the filter element being a first member, the housing sections including second and third members, wherein at least two of the noted members meet at a mating interface, and with the sealing system being a keyed said interface.

Figure 15:
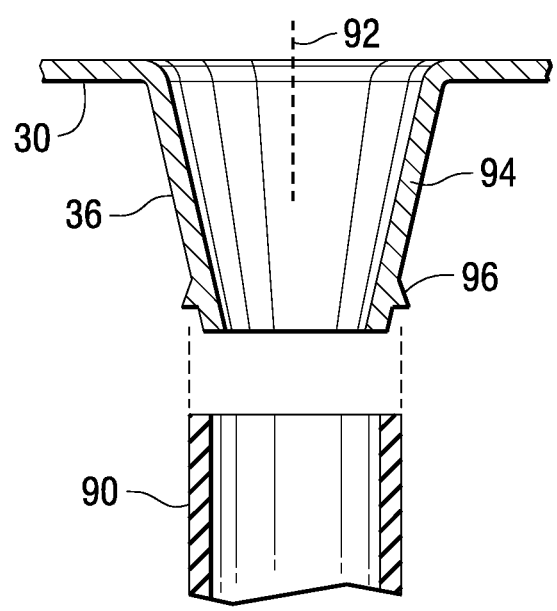
FIG. 15 is an exploded sectional view of a portion of a component of FIG. 1 and illustrating the present invention.

The preferred embodiment of the invention further provides a filtration sealing system for a filter having a filter element in a housing having a housing port 36, FIG. 15, connected to a flow conduit 90 for fluid flow therebetween along a flow direction (downwardly in FIG. 15). Port 36 has a length extending along the flow direction, and a width transverse to such length. The width of the port varies along the length of the port, preferably providing a lead-in for assembly into the flow conduit. The port extends longitudinally along a longitudinal axis 92 along the length and has a tapering sidewall 94 which tapers as it extends longitudinally. Tapering sidewall 94 provides the noted varying width. Port 36 tapers frustoconically along tapering sidewall 94. The tapering sidewall has one or more sealing tabs 96 engaging flow conduit 90 in mechanical wiper sealing relation. Conduit 90 may be a resilient flexible material, e.g. rubber, which may stretch as it fits over and around sidewall 94 and sealing tab 96, or conduit 90 may have a frustoconical taper complemental to the frustoconical taper of sidewall 94.

In a further embodiment, the gasket and the housing are configured such that a new gasket may optionally be supplied every time the filter element is replaced. In a further embodiment, the gasket and the housing are configured such that a new gasket must be replaced every time the filter element is replaced. This reduces concern of the gasket taking a compression set over time at the housing and leaking when it interfaces with the filter element. The housing may be provided with one or more snap-fit slits or grooves for receiving the replaceable gasket.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A filtration sealing system for sealing a filter element in a housing at a mating interface therebetween, said sealing system comprising a keyed said interface, wherein:
   said filter element and said housing have borders mating with each other at a gasket therebetween and providing said mating interface;
   said gasket and at least one of said housing and said filter element engage each other in detent relation providing said keyed interface;
   said gasket extends along an extension direction along a perimeter;
   said gasket has one or more humped arches spaced along said perimeter and extending transversely of said extension direction;
   said one of said housing and said filter element has one or more concave recessed slits spaced along said border along said perimeter and extending transversely of said extension direction and complementally receiving respective said humped arches therein;
   said perimeter defines a perimeteral plane;
   fluid to be filtered flows through said filter element in an axial direction normal to said perimeteral plane;
   said one or more humped arches are humped in said axial direction;
   said one or more concave recessed slits are recessed in said axial direction;
   said gasket is sealed along the entire said extension direction along said perimeter, including being sealed at all of said humped arches and all of said concave recessed slits, and blocks fluid flow laterally across said gasket transversely of said extension direction, including blocking lateral flow across said humped arches and blocking lateral flow across said concave recessed slits.

2. The filtration sealing system according to claim 1 wherein:
   said gasket is in-molded to and integral with said filter element;
   said one or more concave recessed slits are in said housing border.

3. The filtration sealing system according to claim 1 comprising a plurality of said axially humped arches and a plurality of said concave axially recessed slits in complemental decent relation engagement, wherein said plurality of axially humped arches are selectively spaced from each other along said extension direction along said perimeter by flat nonhumped gasket sections between said axially humped arches, wherein said flat nonhumped gasket sections are spaced from each other along said extension direction along said perimeter by said axially humped arches therebetween.

4. The filtration sealing system according to claim 3 wherein said humped arches of said gasket have a greater axial thickness than said flat nonhumped gasket sections.

5. The filtration sealing system according to claim 1 wherein at least one of the size, shape and spacing of at least the set of one or more of said humped arches and the set of one or more of said concave recessed slits is selectively configured to provide a one-way-only fit of said filter element in said housing to ensure correct installation every time.

6. A filtration sealing system for sealing a filter element in a housing at a mating interface therebetween, said sealing system comprising a keyed said interface, said filter element and said housing having borders mating with each other at a gasket therebetween and providing said mating interface, said gasket and at least one of said housing and said filter element engaging each other in detent relation providing said keyed interface, said gasket extending along an extension direction along a perimeter, said perimeter defining a perimetral plane, wherein fluid to be filtered flows through said filter element in an axial direction normal to said perimetral plane, said filter element border and said housing border mating with each other and having respective facing sealing surfaces facing each other across said gasket therebetween, at least one of said facing sealing surfaces of said filter element border and said housing border being non-flat in said axial direction.

\* \* \* \* \*